(12) United States Patent
Kim

(10) Patent No.: US 10,611,227 B2
(45) Date of Patent: *Apr. 7, 2020

(54) MOUNT ASSEMBLY FOR VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/153,182

(22) Filed: Oct. 5, 2018

(65) Prior Publication Data

US 2019/0366825 A1    Dec. 5, 2019

(30) Foreign Application Priority Data

Jun. 4, 2018 (KR) ........................ 10-2018-0063992

(51) Int. Cl.
*B60K 5/12* (2006.01)

(52) U.S. Cl.
CPC ......... *B60K 5/1208* (2013.01); *B60Y 2200/50* (2013.01); *B60Y 2200/80* (2013.01); *B60Y 2200/92* (2013.01)

(58) Field of Classification Search
CPC combination set(s) only.
See application file for complete search history.

(56) References Cited

U.S. PATENT DOCUMENTS

| 4,905,956 A * | 3/1990 | Zemlicka | B60K 5/1291 248/562 |
| 5,242,146 A * | 9/1993 | Tecco | F16F 1/3935 248/636 |
| 7,159,856 B2 * | 1/2007 | Satori | F16F 13/105 267/140.13 |
| 8,430,373 B2 * | 4/2013 | Nishi | F16F 13/108 248/562 |
| 8,864,114 B2 * | 10/2014 | Masuda | F16F 13/106 267/140.13 |
| 8,894,051 B2 * | 11/2014 | Yamamoto | F16F 13/106 267/140.13 |

(Continued)

FOREIGN PATENT DOCUMENTS

| DE | 10 2004 039 825 B4 | 10/2010 |
| JP | H 06-346942 A | 12/1994 |

(Continued)

*Primary Examiner* — Monica E Millner
(74) *Attorney, Agent, or Firm* — Mintz Levin Cohn Ferris Glovsky and Popeo, P.C.; Peter F. Corless

(57) ABSTRACT

A mount assembly for a vehicle is provided. The mount assembly includes a mount that supports an in-vehicle device and a support bracket that is coupled and locked to the mount. The support bracket includes a first hook. The mount assembly further includes a mounting bracket that couples the mount to a vehicle body. The mounting bracket includes a housing to which the mount is coupled and a first stop protrusion to which the first hook of the support bracket is hook-coupled. A wedge ring supports the first hook from behind to prevent the first hook from bending backward and being separated from the first stop protrusion.

16 Claims, 14 Drawing Sheets

(56) References Cited

U.S. PATENT DOCUMENTS

| | | | |
|---|---|---|---|
| 9,428,023 B2 | 8/2016 | Dehlwes | |
| 2015/0252866 A1* | 9/2015 | Muraoka | F16F 13/103 |
| | | | 267/140.13 |
| 2018/0162211 A1* | 6/2018 | Kim | B60K 5/1208 |
| 2019/0072151 A1* | 3/2019 | Kim | B60K 5/1208 |

FOREIGN PATENT DOCUMENTS

| | | |
|---|---|---|
| JP | 2813582 B2 | 10/1998 |
| KR | 10-1092369 | 12/2011 |
| KR | 10-2017-0029677 | 3/2017 |
| WO | 2017/076914 A1 | 5/2017 |
| WO | 2017/129531 A1 | 8/2017 |

\* cited by examiner

Detailed view of portion A

MOUNT ASSEMBLY FOR VEHICLE

CROSS REFERENCE TO RELATED APPLICATION

The present application claims priority to Korean Patent Application No. 10-2018-0063992, filed on Jun. 4, 2018, the entire contents of which is incorporated herein by reference.

BACKGROUND

Field of the Invention

The present invention relates to a mount assembly for a vehicle, and more particularly, to a mount assembly for a vehicle that prevents release of coupling between parts due to separation of a hook from a stop protrusion in a hook structure.

Description of the Related Art

As the vehicle technologies gradually develop and consumer demands for low vibration and low noise increase, efforts are being made to maximize the ride comfort through analysis of noise, vibration, and shock in vehicles. Engine vibration generated in a specific rotations per minute (RPM) region when the vehicle operates is transmitted to the interior of the vehicle at a specific frequency through the vehicle body, and the frequency component of the detonation in the engine influences the interior of the vehicle.

In the engine of a vehicle, vibration is generated structurally due to the periodic change of the center position caused by the reciprocal movement of the piston and the connecting rod, the inertial force of the reciprocating portion that is exerted in the cylinder axis direction, the inertial force caused by the connecting rod that swings to the left and right sides of the crankshaft, a periodic change in the rotational force applied to the crankshaft, and the like. Accordingly, an engine mount is disposed between the engine and the vehicle body to support the engine and attenuate noise and vibration transmitted from the engine. The engine mount is classified into a rubber engine mount, an air damping mount, and a fluid encapsulated engine mount.

The rubber engine mount, which is usually made of a rubber material, is vulnerable to vibration with low frequency/high amplitude, and attenuation performance thereof is insufficient for the vibration with high frequency/low amplitude and the vibration with low frequency/high amplitude. Accordingly, the fluid encapsulated engine mount is widely used since the fluid encapsulated engine mount is capable of absorbing and attenuating vibrations over a wide range of frequencies including the vibration with high frequency/low amplitude and the vibration with low frequency/high amplitude that is input to the engine mount according to the operation of the engine. In the fluid encapsulated engine mount, also referred to as a fluid mount or a hydro mount, a damping force is generated as the fluid enclosed under the insulator flows through a flow path between an upper liquid chamber and a lower liquid chamber. The fluid encapsulated engine mount is capable of attenuating both high-frequency vibration (low amplitude vibration) and low-frequency vibration (large amplitude vibration).

In recent years, active mounts and semi-active mounts have been developed to improve the vibration isolation characteristics of the fluid encapsulated engine mount. Furthermore, weight reduction of a vehicle is related to fuel efficiency and to collision performance and assemblability. The engine mounting system has also been developed with a change in material from steel to aluminum and to plastic for lighter weight, and plastic parts such as plastic cores, plastic brackets, plastic orifices, and the like are increasingly used.

However, to achieve reduced weight by replacing the material of the parts to plastics, a consideration of the assembly of the components in the mounting system is required since plastic parts have strength and tolerance issues compared to steel or aluminum parts. Thus, the robustness of the assembly is considered in the application of plastic materials. A representative example is an assembly structure of a plastic cover (e.g., a bearing cover) that uses a hook structure, which is an assembly method using a plurality of hooks. Since strength and tolerance may be complemented by the number of hooks, the hook structure is widely used.

However, the application of the hook structure for fastening the parts using hooks is insufficient in terms of fastening force and assembly robustness. In other words, the fastening force between the parts by the hooks is weak, and when the hooks move from the corresponding parts due to vibrations, the hooks may be separated from the corresponding parts. Further, the rigidity at a center bolt (e.g., the rigidity at the mount input point) is low for the conventional mount since the support height of the inner core and the center bolt coupled to the engine is high with respect to the support surface of the lower side.

Accordingly, to compensate for the low rigidity at the input point, a mass damper is disposed on the mount or mounting bracket, and thus, the weight of the mass damper prevents the weight reduction of the vehicle. Further, since the orifice assembly of the mount is proximate to the tire space due to the nature of the location where the mount is disposed, decreasing the height is limited. In addition, reducing the size of the insulator of rubber material is also difficult, and therefore, a technique for reducing the size of the orifice assembly has been developed to decrease the height of the mount. The height of the mount may be reduced by reducing the size of the orifice assembly by applying the above-described hook structure to the mount, but since the hook structure has insufficient fastening force and assembly robustness as described above, applying the hook structure is difficult.

To facilitate understanding of the present invention, a problem of a mount and a hook structure applied to the mount and according to the related art will be described in more detail.

First, a device in the related art is configured to allow a bearing cover to be hook-coupled to an elastic support, thereby integrally coupling the bearing cover, a bellows, a barrier, the elastic support, which are components of a mount. In this reference, the mount is referred to as bearing, a diaphragm as bellows, and an orifice plate as barrier. In this configuration of the mount, since the conventional forced press-fit assembly method is changed to the hook assembly method, in which the components of the mount are coupled using a hook structure of the bearing cover, the size of the orifice assembly is reduced and the height of the mount is lowered, thereby reducing weight and cost.

The hook structure is easily separated, and is a structure that merely connects the components of the mount to each other and maintains the assembled state thereof before mounting the same to a vehicle body. However, the hook structure is not for coupling or supporting a pre-assembled assembly including an insulator to a mounting bracket fixed to the vehicle body side. Accordingly, when mounting the mount to the vehicle body, the mount is supported by a separate subframe or the like, but when the subframe is unusable, the use of the mount is restricted.

Generally, when mounting and fixing the mount to the vehicle body using a metal mounting bracket (e.g., aluminum alloy), a housing of the mounting bracket is assembled to surround the mount from the outside. In particular, a lower end portion of the housing is curled (e.g., curved) to abut the lower portion of the bearing cover to allow the housing of the mounting bracket to support the lower portion of the bearing cover of the mount. As a result, a lower side of the bearing cover of the mount is hook-coupled downward by the lower end portion of the curled housing as described above to allow the bearing cover of the mount to be supported by the housing of the mounting bracket. Accordingly, in the structure in which the housing of the mounting bracket is curled, the housing is curled to allow the lower end portion of the housing to surround the lower side of the bearing cover from the side surface thereof. In particular, the mounting bracket is manufactured in aluminum alloy with high elongation.

However, when aluminum materials with high elongation are used, the cost is high, and strength and rigidity are low. When an aluminum material with high strength and rigidity is used, the elongation is low and cracks occur while performing curling of the housing, which results in a high defect rate. Accordingly, instead of performing curling, a pipe with the insulator of the mount locked thereto may be forcedly press-fitted into the housing of the mounting bracket of metal (e.g., aluminum), but with this forced press-fitting method, fixing the parts together is difficult.

Further, the mount and the mounting bracket are fixed by a hook structure, and the hook structure for fastening the mount with the mounting bracket is illustrated in FIGS. 10 and 11. FIG. 10 is a cross-sectional view that shows a mount assembly in the related art, and FIG. 11 is an enlarged cross-sectional view of portion A in FIG. 10. As shown in the drawings, a support bracket 160 is used to couple a mount 100 to a mounting bracket 170 for mounting the mount to a vehicle body.

The support bracket 160, which is a ring-shaped bracket fixedly coupled to a lower portion of the mount 100, is fitted over an orifice assembly 140 from the lower portion of the mount 100, and includes a plurality of hooks 164 along a circumferential direction. Thus, when the hooks 164 of the support bracket 160 are coupled to a housing 171 of the mounting bracket 170, the mount 100 is coupled to the mounting bracket 170 via the support bracket 160. In particular, the hook structure, for coupling and fixing the mount 100 to the mounting bracket 170 by using the hooks 164, includes the hooks 164 formed on the support bracket 160, and the hooks 164 of the support bracket 160 are coupled to stop protrusions 173 of the mounting bracket 170, thereby coupling the mount 100 to the mounting bracket and maintaining the assembled state therebetween simultaneously.

The hooks 164 of the support bracket 160 are configured to be hook-coupled downwardly to the stop protrusions 173 on a groove 172 formed on an inner surface of the housing 171 of the mounting bracket 170, and with the hooks 164 respectively hook-coupled to the stop protrusions 173, the mount 100 coupled to the support bracket 160 is supported by the mounting bracket 170. In such a configuration that uses the hook structure, since the height of the mount is decreased, the rigidity at the mount input point is increased and the weight is reduced due to the application of the plastics, and since the hooks, which are elastic structures for hook-coupling, are disposed inside the mounting bracket, the layout is improved as well.

However, the hook structure has insufficient fastening force and assembly robustness. In other words, the fastening force between the parts by the hooks is weak and the part may be separated easily from the other part when the hooks are moved with respect to the counterpart due to vibration or the like. FIG. 11 is a view for illustrating a hook structure of a mount assembly in the related art. As shown in FIG. 11, when the hooks 164 formed in the support bracket 160 of a plastic material (e.g., a synthetic resin) are bent by the force due to vibration or the like, the components of the mount 100 such as an insulator 130 are separated from the mounting bracket 170 to the lower side. In other words, when the hooks 164 are moved or bent in the releasing direction rather than in the coupling direction with respect to the stop protrusions 173 of the mounting bracket 170, the components of the mount 100 including the insulator 130 may be separated from the mounting bracket 170.

The foregoing is intended merely to aid in the understanding of the background of the present invention, and is not intended to mean that the present invention falls within the purview of the related art that is already known to those skilled in the art.

SUMMARY

Accordingly, the present invention provides a mount assembly for a vehicle, in particular, the mount assembly capable of preventing release of coupling between parts due to separation of a hook from a stop protrusion in a configuration in which a hook structure is used.

To achieve the above object, the mount assembly may include a mount to support an in-vehicle device and a support bracket coupled to the mount and locked thereto. The support bracket may include a first hook. The mount assembly may further include a mounting bracket configured to couple the mount to a vehicle body side and support the mount. The mounting bracket may include a housing to which the mount is coupled and a first stop protrusion to which the first hook of the support bracket is hook-coupled to allow the support bracket to be coupled and locked to the mounting bracket by coupling between the first hook and the first stop protrusion. In particular, the mount assembly may further include a wedge ring to support the first hook coupled to the first stop protrusion from behind while being assembled to a lower outer circumferential surface of the mount to prevent the first hook from bending backward and being separated from the first stop protrusion of the mounting bracket.

According to the mount assembly for a vehicle of the present invention, a wedge ring for supporting and locking a hook with a mounting bracket coupled therewith is provided to prevent the hook of the support bracket from being moved or bent due to the wedge ring. Therefore, the hook may be prevented from being released and the hook-coupled state may be maintained, and thus, the separation of the mount including the insulator may be effectively prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present invention will be described with reference to the accompanying drawings. The present invention, however, is not limited to the example embodiments set forth herein, and those skilled in the art will appreciate that the present invention may be embodied in many alternate forms.

In the present invention, the mount assembly may include a support bracket of a plastic material to prevent hooks of the support bracket from being moved or bent by the force due to vibration or the like, an anti-release structure may support and lock the hooks engaged with the mounting brackets and to firmly maintain the hooks in the engaged state. The mount assembly according to an exemplary embodiment of the present invention, and particularly the mount assembly including the anti-release structure, will be described in detail with reference to the drawings.

Figure 1A:
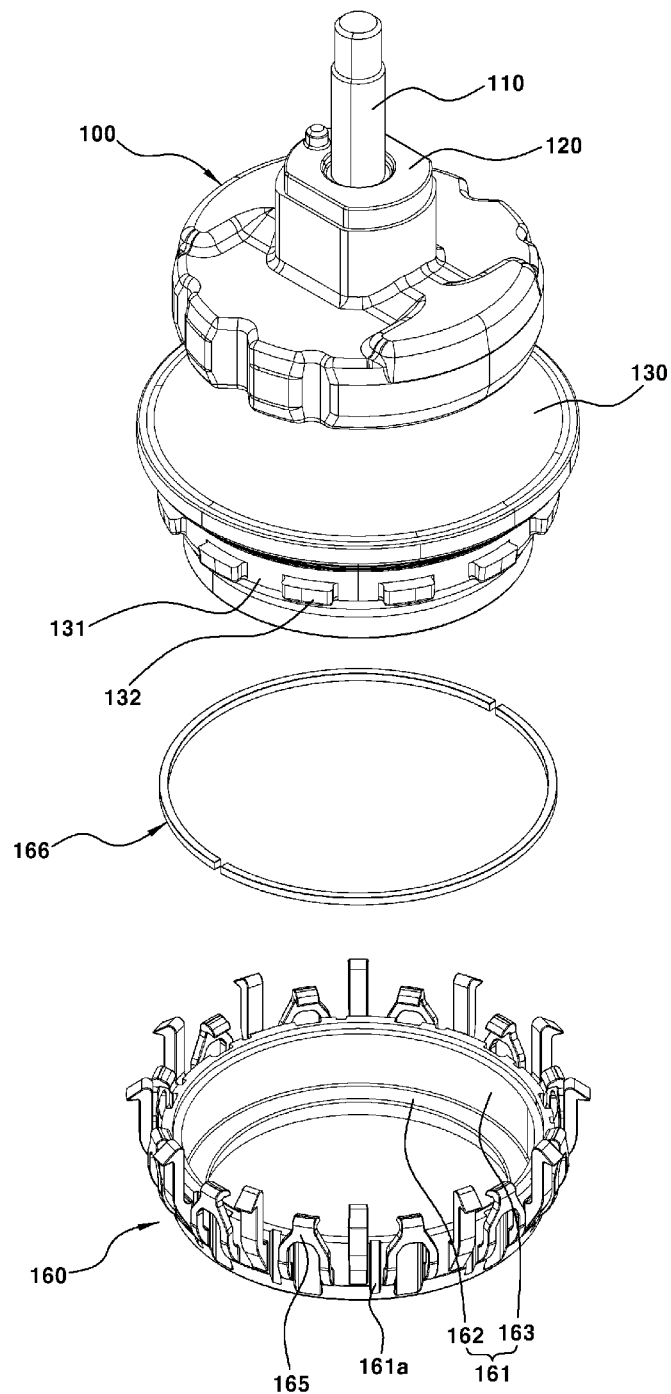
FIGS. 1A to 1F are views sequentially showing an assembly process of a mount assembly according to an exemplary embodiment of the present invention.
Figure 1B:
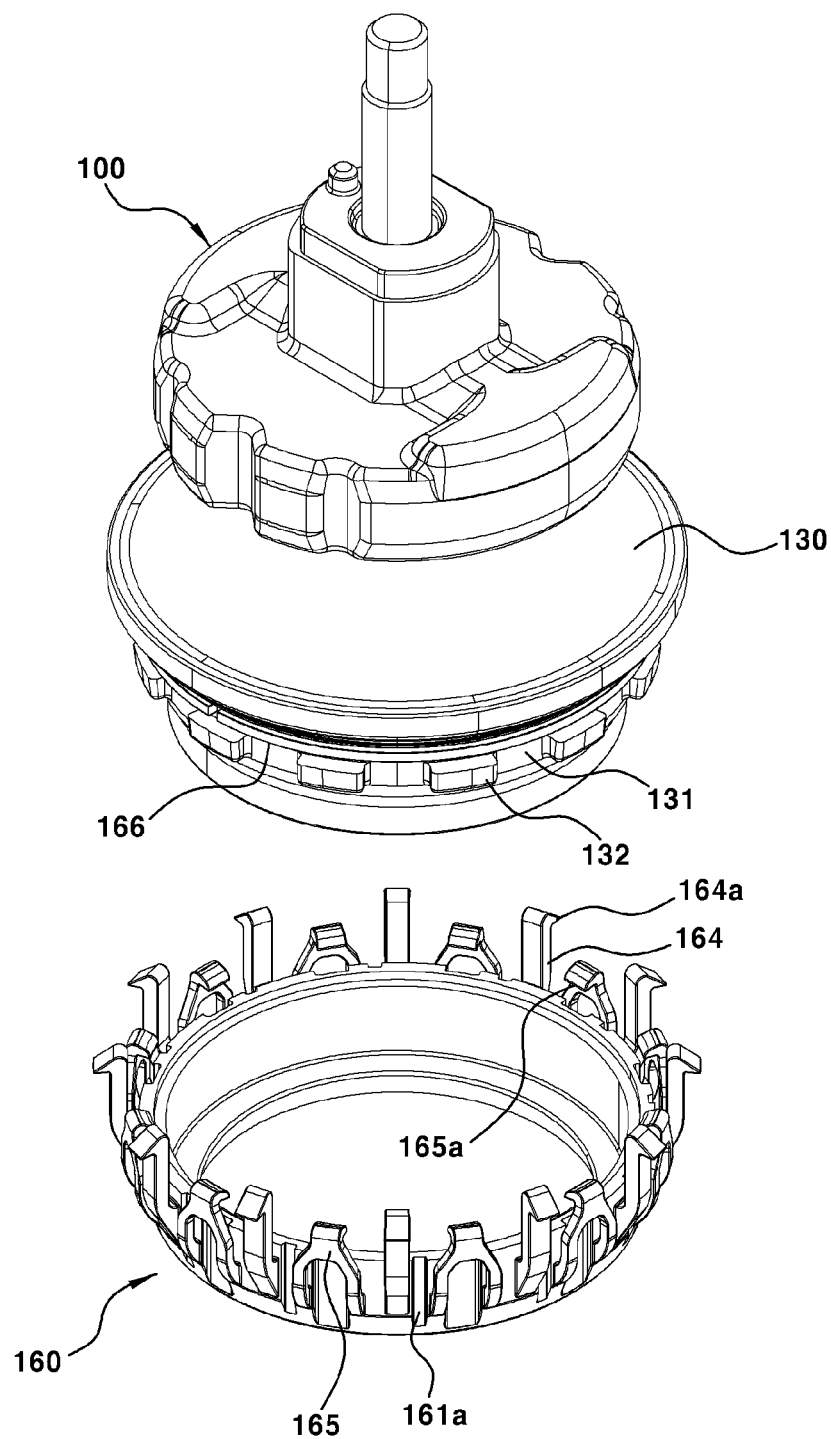
Figure 1C:
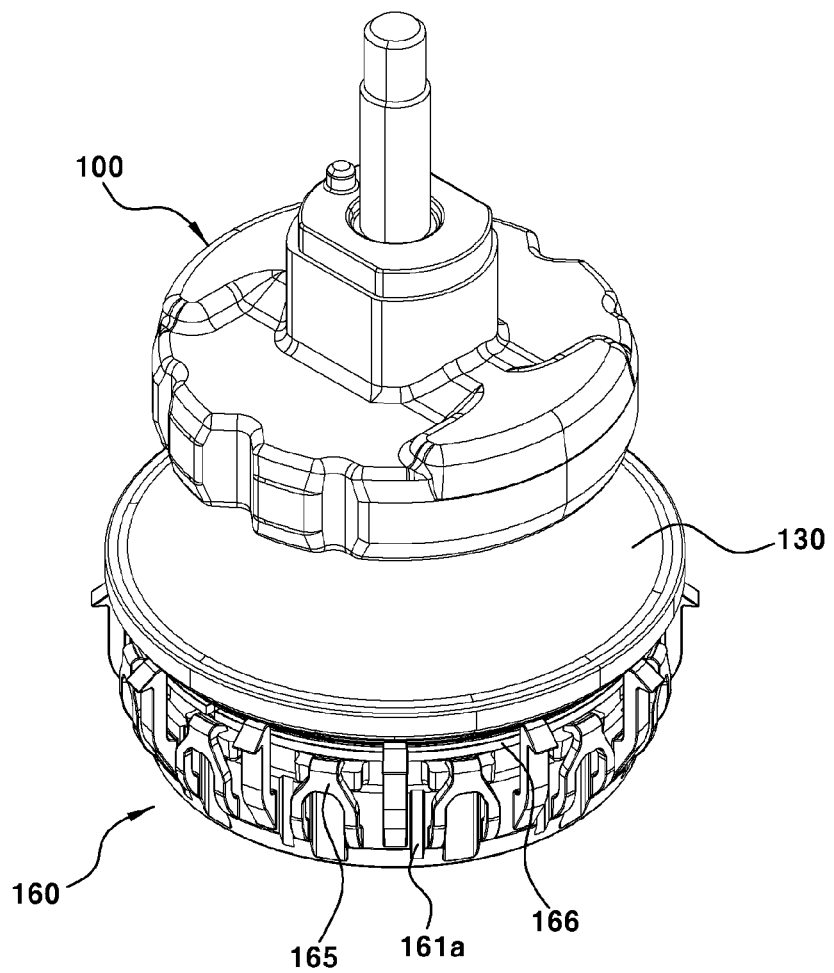
Figure 1D:
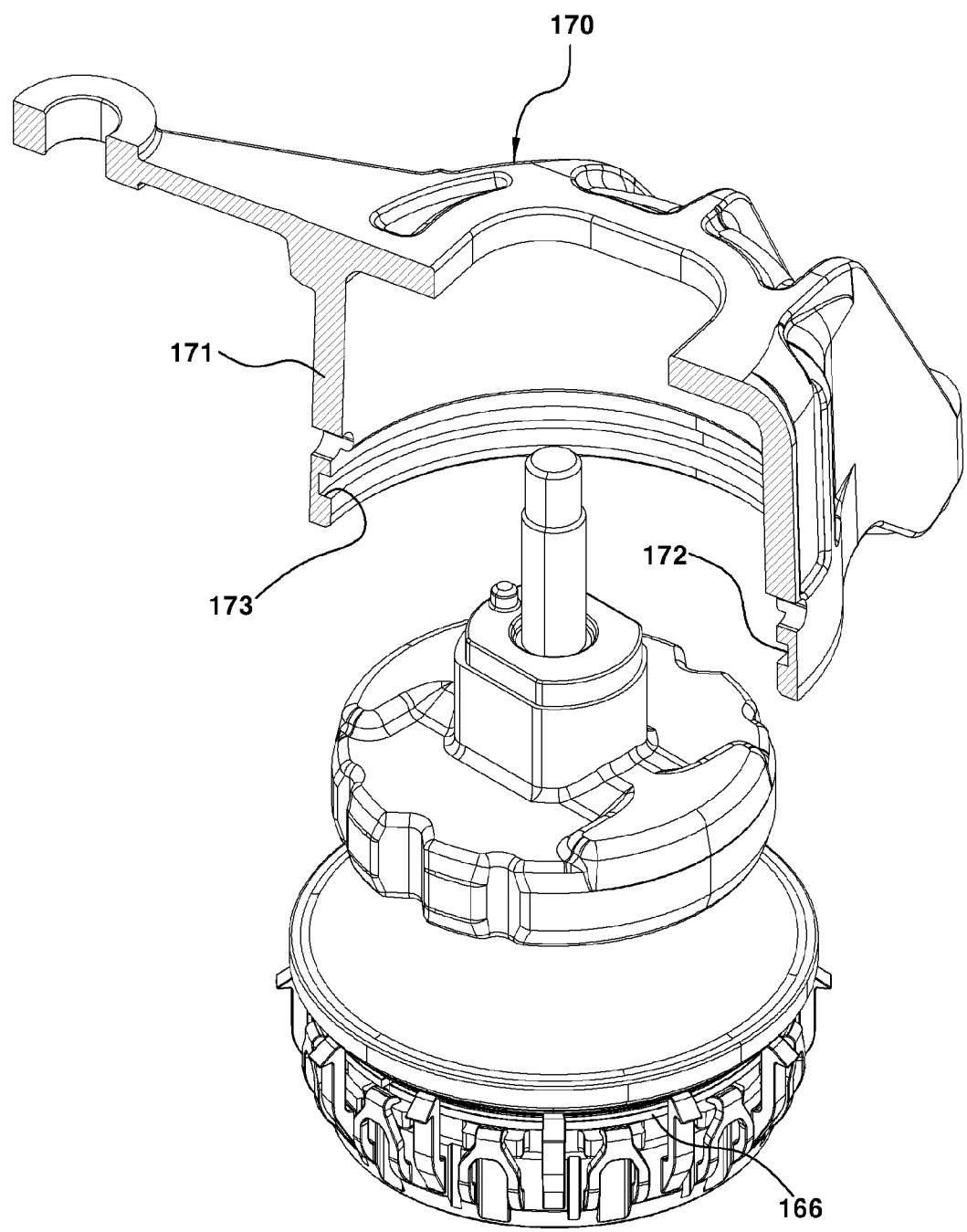
Figure 1E:
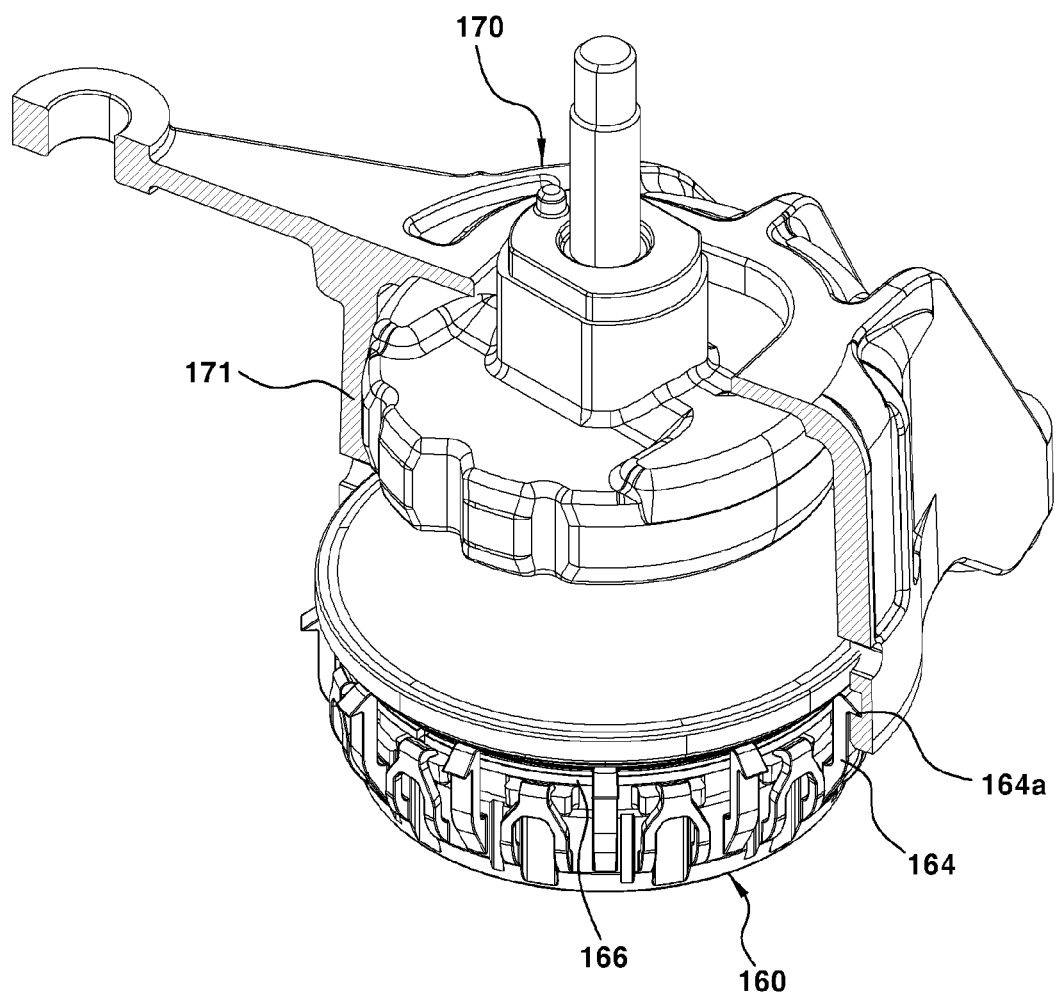
Figure 1F:
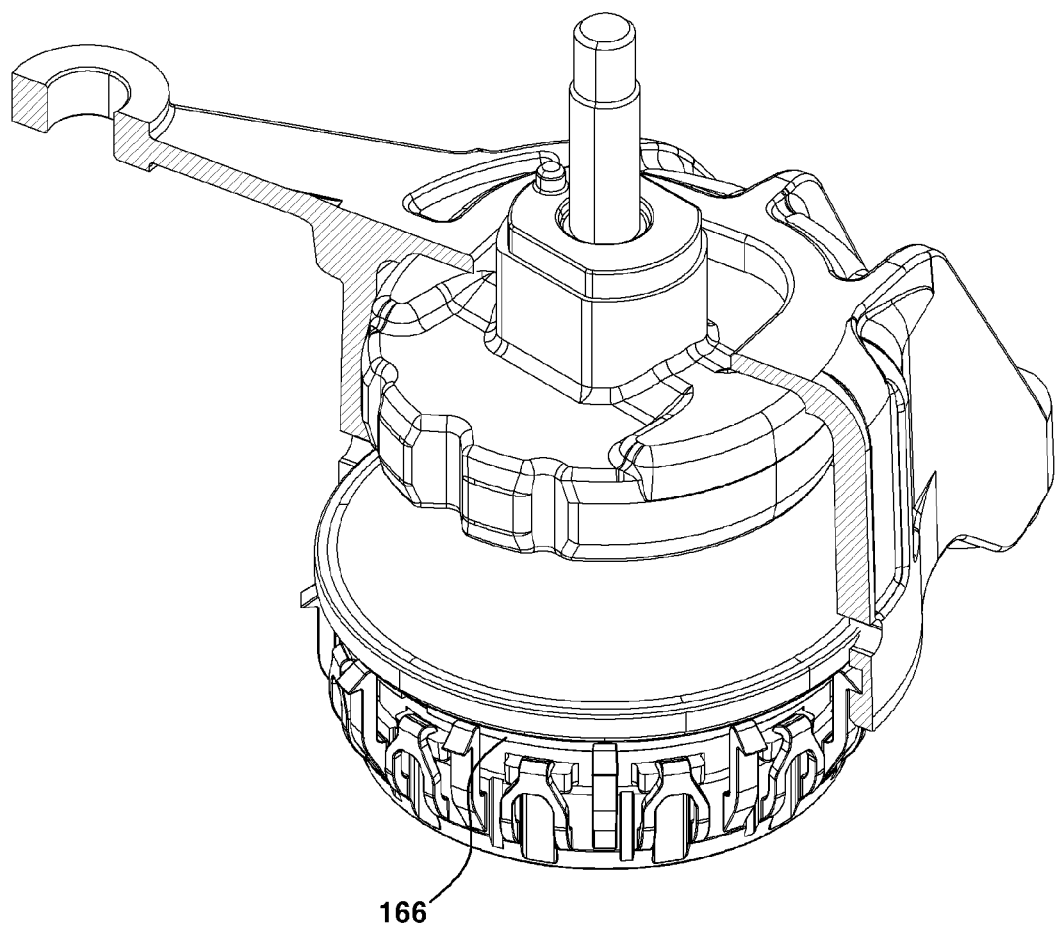
Figure 2:
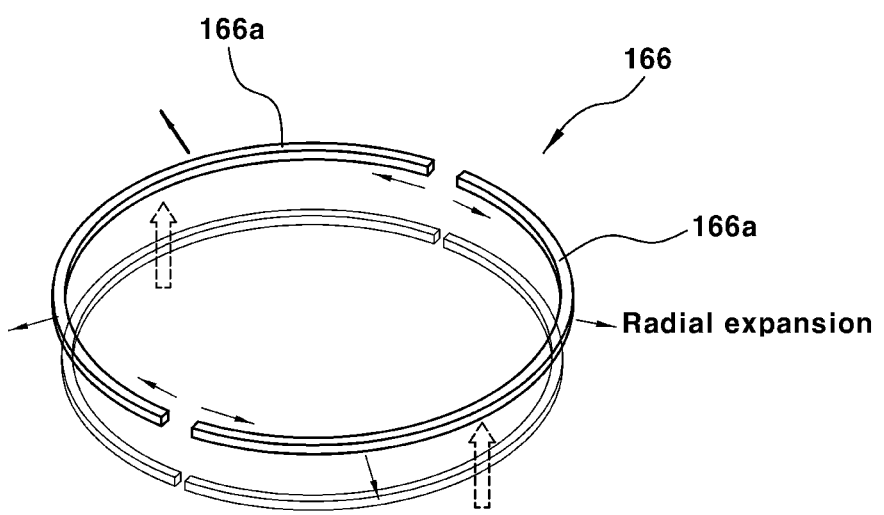
FIG. 2 is a perspective view showing a wedge ring in the mount assembly according to an exemplary embodiment of the present invention.
Figure 3:
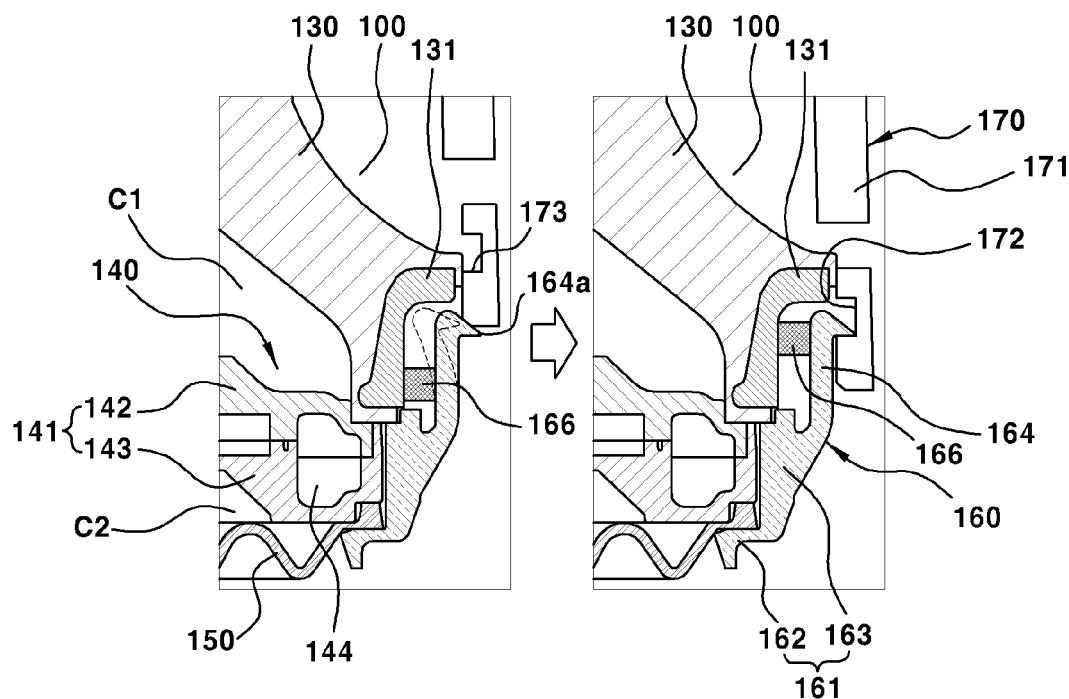
FIG. 3 is a cross-sectional view showing a hook structure with an anti-release structure applied thereto in the mount assembly according to an exemplary embodiment of the present invention.
Figure 4:
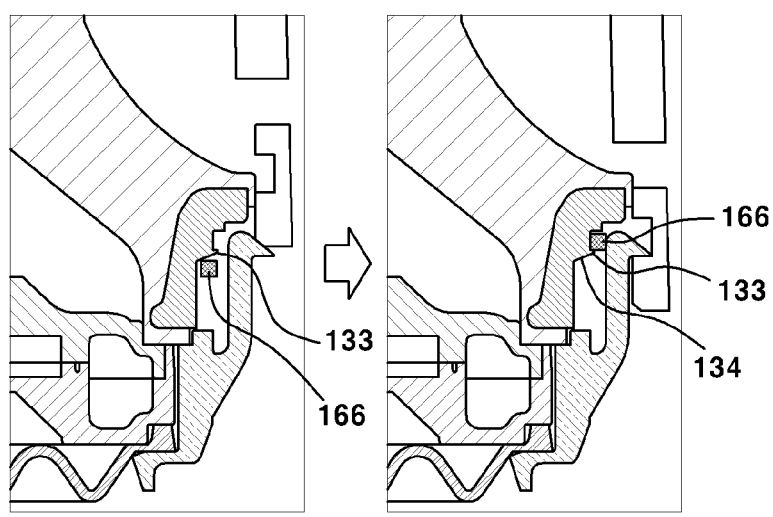
FIG. 4 is a cross-sectional view showing another exemplary embodiment of the present invention, in which the mount assembly is provided with a sliding guide portion and a locking protrusion for the wedge ring.
Figure 5:
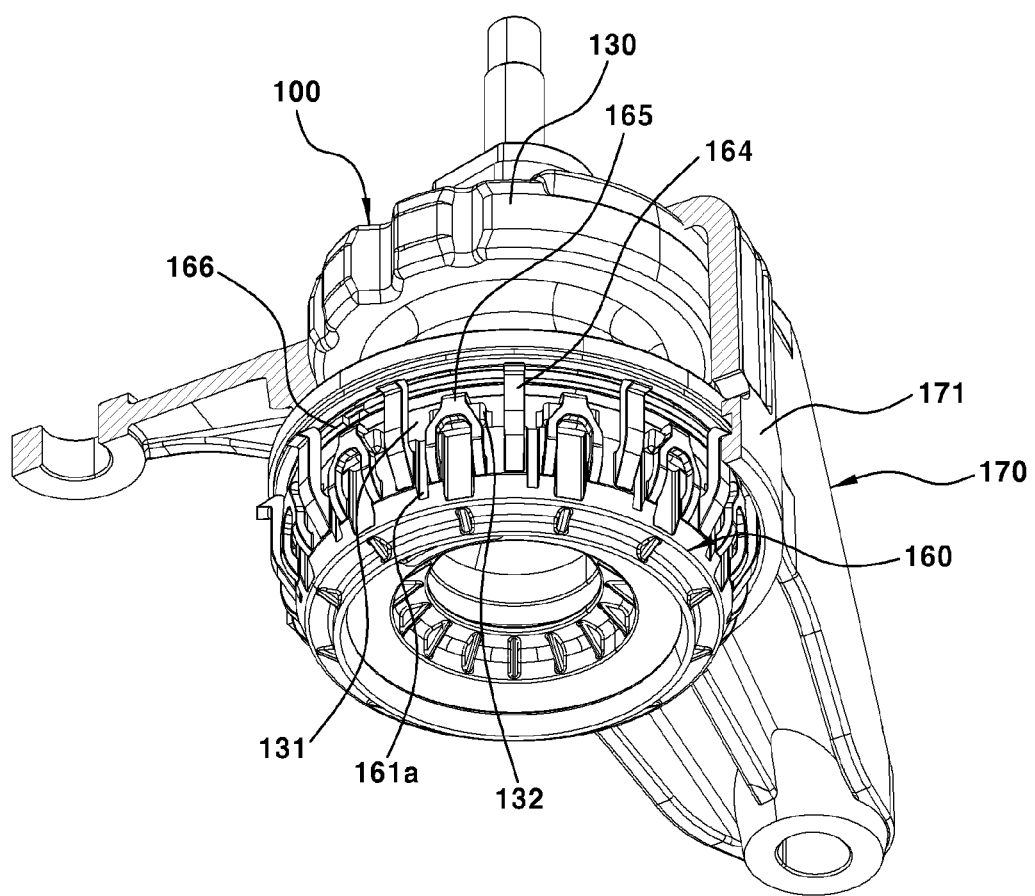
FIG. 5 is a perspective view showing a state before the wedge ring is moved up in the mount assembly according to an exemplary embodiment of the present invention.
Figure 6:
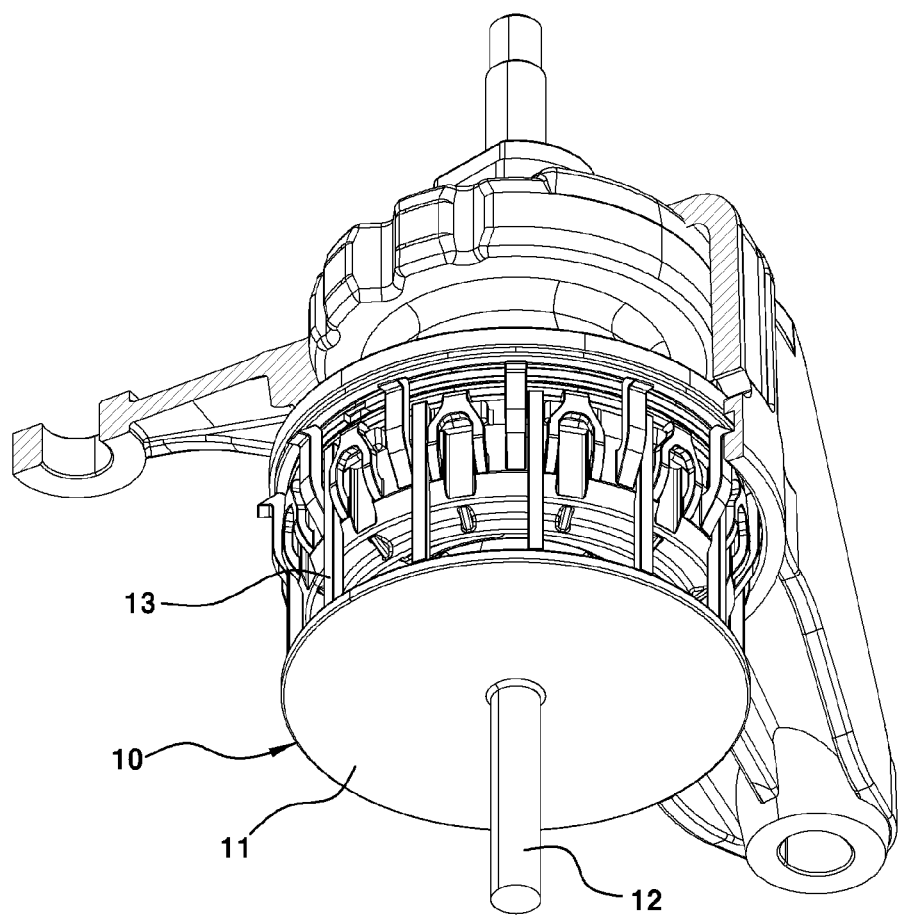
FIG. 6 is a perspective view showing a state where wedge ring is moved up by using a jig in the mount assembly according to an exemplary embodiment of the present invention.

FIGS. 1A to 1F are views sequentially showing an assembly process of a mount assembly according to an exemplary embodiment of the present invention. FIG. 2 is a perspective view showing a wedge ring in the mount assembly according to an exemplary embodiment of the present invention and FIG. 3 is a cross-sectional view showing a hook structure with an anti-release structure applied thereto in the mount assembly according to an exemplary embodiment of the present invention. Further, FIG. 4 is a cross-sectional view showing another exemplary embodiment of the present invention, in which the mount assembly is provided with a sliding guide portion and a locking protrusion for the wedge ring. FIG. 5 is a perspective view showing a state before the wedge ring is moved up in the mount assembly according to an exemplary embodiment of the present invention and FIG. 6 is a perspective view showing a state where wedge ring is moved up by using a jig in the mount assembly according to an exemplary embodiment of the present invention.

A mount assembly for a vehicle according to an exemplary embodiment of the present invention for supporting an in-vehicle device may include an engine mount assembly for supporting an engine. The engine mount assembly may include a mount 100 configured to support an in-vehicle device; a support bracket 160 coupled to the mount 100 and locked thereto; and a mounting bracket 170 configured to mount the mount 100 to a vehicle body side and maintain the mounting bracket 170 to be coupled to the mount 100 and the support bracket 160. Further, in the assembly for a vehicle according to an exemplary embodiment of the present invention, the mount 100 may include a center bolt 110 fastened to an engine side; an inner core 120 with the center bolt engaged therewith; and the insulator 130 of a rubber material formed to be integrally coupled with the inner core 120.

The insulator 130 may fix and support the inner core 120 and may form an upper liquid chamber C1 along with the orifice assembly 140 under the insulator. The inner core 120 may be made of a metallic material, for example, aluminum alloy, or may be formed of a plastic material (e.g., synthetic resin). A pipe 131 may be coupled to a lower portion of the insulator 130, wherein the pipe 131 may be formed of a plastic material. Further, after the inner core 120 in which the center bolt 110 is disposed is manufactured, the inner core 120 and the pipe 131 may be mounted in the mold, and then the rubber insulator 130 may be formed to be integrally coupled to the inner core 120 and the pipe 131 through a curing process.

The orifice assembly 140 may include an orifice plate 141 and a membrane (not shown). The orifice plate 141 may be laterally disposed within the mount 100 at a location below the insulator 130 to partition a liquid chamber in the mount 100 into the upper liquid chamber C1 and a lower liquid chamber C2. The orifice plate 141 may include an upper plate 142 and a lower plate 143. Further, the orifice plate 141 may include an orifice 144 that forms an annular bypass flow path (also referred to as an inertia track) for guiding fluid flow between the upper liquid chamber C1 and the lower liquid chamber C2. The orifice plate 141 may include a first aperture that allows communication between the orifice 144 and the upper liquid chamber C1 and a second aperture that allows communication between the orifice 144 and the lower liquid chamber C2.

Accordingly, the upper liquid chamber C1, the orifice 144, and the lower liquid chamber C2 may communicate with each other through the apertures of the orifice plate 141 to allow the fluid to flow therebetween. Thus, the orifice 144 may provide a flow path for the fluid and may communicate with the upper liquid chamber C1 and the lower liquid chamber C2 through the apertures, thereby providing a fluid passage that connects the upper liquid chamber C1 and the lower liquid chamber C2, i.e., a flow path that allows the fluid to move between the liquid chambers C1 and C2 on both sides. Further, a diaphragm 150 may be disposed below the orifice plate 141 and both the orifice plate 141 and the diaphragm 150 may form the lower liquid chamber C2.

As described above, after the rubber insulator 130 integrally coupled to the inner core 120 and the pipe 131 is formed through curing process, a wedge ring 166 may be assembled on a lower outer circumferential surface of the mount 100, i.e., on outer circumferential surface of the pipe 131. Subsequently, the orifice assembly 140 having the upper plate 142 and the lower plate 143 of the orifice plate 141 and the membrane (not shown) disposed between the upper plate 142 and the lower plate 143 may be assembled to a lower end portion of the insulator 130. After the diaphragm 150 is assembled to a lower portion of the orifice assembly 140, the support bracket 160 having a hook structure may be assembled at a lower side of the diaphragm 150 as described below.

In the mount 100 as described above, the inner space of the mount 100 including the upper liquid chamber C1 and the lower liquid chamber C2 may be filled with fluid and sealed, and the mount 100 may be coupled to the mounting bracket 170 to mount to the vehicle body. In particular, the lower portion of the mount 100 may be fastened to the mounting bracket 170 using the support bracket 160, wherein a hook-coupling method may be used in which the hooks 164 of the support bracket 160 are locked to the mounting bracket 170. Herein, the lower portion of the mount 100 may refer to the lower part of the mount 100 where the pipe 131, the orifice assembly 140, and the diaphragm 150 are disposed.

In the exemplary embodiment of the present invention, the support bracket 160 may be fastened to the mounting bracket 170 by the hook structure while being coupled to the lower portion of the mount 100, thereby integrally coupling and fixing the lower portion of the mount 100 to the mounting bracket 170. Further, the support bracket 160 may include a hook structure fastened to the lower portion of the mount 100. Accordingly, in the exemplary embodiment of the present invention, the support bracket 160 may include a hook structure that is fastened to the mounting bracket 170 and the lower portion of the mount 100, respectively.

Furthermore, the support bracket 160 may include an annular ring 161 coupled along the entire lower portion of the mount 100 to abut the lower portion of the mount 100 and support the mount 100 by surrounding the mount 100. The support bracket 160 may also include a hook structure formed on the ring 161 and fastened to the mounting bracket 170. In addition, the support bracket 160 may include a hook structure fastened to the lower portion of the mount 100.

In particular, the ring 161 of the support bracket 160 may include a ring-shaped bottom portion 162 configured to be coupled to a lower surface of the mount 100, i.e., the edge portion of the diaphragm 150 to abut the ring-shaped bottom portion 162 while being coupled to the lower portion of the mount 100 and a ring-shaped side portion 163 that integrally extends from the bottom portion 162 upwardly and is disposed to surround the lower side surface of the mount 100, i.e., a side surface of the orifice assembly 140. The bottom portion 162 and the side portion 163 may be formed integrally to form the ring 161 and the bottom portion 162 may support the edge of the diaphragm 150, which is the lower surface of the mount 100.

Further, the side portion 163 of the ring 161 may be provided integrally with a hook structure for fastening the mounting bracket 170 and the lower portion of the mount 100 together. The hook structure may include a first hook 164 for fastening with the mounting bracket 170 and a second hook 165 for fastening with the lower portion of the mount 100. The first hook 164 and the second hook 165 may be formed to extend upwardly from an outer circumferential surface of the ring 161 (i.e., an outer circumferential surface of the side portion). An end portion of the first hook 164 may be formed with a stop end 164a to be hook-coupled downwardly to the first stop protrusions 173 on the groove 172 formed on the inner surface of the housing 171 of the mounting bracket 170.

An end portion of the second hook 165 may be formed with a stop end 165a to be hook-coupled downwardly to the lower portion of the mount 100 and, more particularly, to a second stop protrusion 132 that protrudes from the outer circumferential surface of the pipe 131 coupled to the insulator 130. In particular, each hook may be formed to allow the upper end of the first hook 164 to be disposed higher than the upper end of the second hook 165. The first hook 164 may be disposed inside the housing 171 of the mounting bracket 170 to be fastened to the first stop protrusions 173 of the housing 171 disposed outside of the first hook 164, and the second hook 165 may be fastened to the second stop protrusion 132 of the lower portion of the mount 100 disposed inside of the second hook 165. Accordingly, the stop end 164a may protrude outwardly from the upper end portion of the first hook 164 and the stop end 165a may protrude inwardly from the upper end portion of the second hook 165.

In an exemplary embodiment, a plurality of first hooks 164 and second hooks 165 may be arranged at predetermined intervals along a circumferential direction in the ring 161. As shown in FIG. 5, each first hook 164 and each second hook 165 may be alternately arranged one after the other in the circumferential direction of the ring 161 of the support bracket 160. Furthermore, in the exemplary embodiment of the present invention, the support bracket 160 may be made and formed of a plastic material (e.g., a synthetic resin), and thus, the first hook 164 and the second hook 165 may have resilient (e.g., elastic) structures.

The first hook 164 may be engaged with the first stop protrusions 173 formed on the inner circumferential surface of the housing 171 of the mounting bracket 170. Further, after the insulator 130, the orifice assembly 140, the diaphragm 150, and the like are assembled, the assembled mount 100 may be press-fitted into the housing 171 of the mounting bracket 170, whereby the hook structure may be fastened. When press-fitting, the first hook 164 and the second hook 165 may be bent (e.g., elastically deformed) in a direction opposite to the fastening direction due to the contact surfaces. When the hook is press-fitted to the predetermined position, the hooks may be restored by the elasticity and the stop ends 164a and 165a of the hooks may be engaged with respective stop protrusions 132 and 173.

In other words, before the first hook 164 is engaged with the first stop protrusions 173 of the mounting bracket 170, while the stop end 164a of the first hook 164 is in contact with the inner circumferential surface of the mounting bracket 170, when the first hook 164 is deformed inwardly and the stop end 164a of the first hook 164 reaches the groove 172 of the mounting bracket 170, the first hook 164 may be restored outwardly to the shape thereof by elasticity and the stop end 164a of the first hook 164 may be stopped by the first stop protrusions 173 of the groove 172. Likewise, before the second hook 165 is fastened to the second stop protrusion 132 of the pipe 131, which is the lower portion of the mount 100, while the stop end 165a of the second hook 165 is in contact with the outer circumferential surface of the pipe 131, the second hook 165 may be deformed outwardly and the stop end 165a of the second hook 165 may slide over the second stop protrusion 132. Accordingly, the second hook 165 may be restored inwardly to the shape thereof by elasticity and the stop end 165a of the second hook 165 may be stopped by the second stop protrusion 132.

To prevent the first hook 164 from being separated from the first stop protrusions 173 of the mounting bracket 170, the mount assembly according to an exemplary embodiment of the present invention may include the wedge ring 166 that maintains the first hook 164 to be engaged with the first stop protrusions 173 from the inside of the first hook to prevent the first hook 164 from bending (e.g., being deflected) inwardly. When the first hook 164 is bent inwardly, the stop end 164a may be separated from the first stop protrusions 173 of the mounting bracket 170 disposed outside the stop end, whereby the fastening state of the first hook 164 with the mounting bracket 170 may be released. Accordingly, in the present invention, the wedge ring 166 may be assembled, which retains the first hook 164 from the inside of the first hook 164 to prevent the first hook 164 from being separated from the first stop protrusions 173.

The wedge ring 166 may be made and formed of a plastic material (e.g., synthetic resin), and the wedge ring 166 may be made to have elasticity and to have a substantially circular ring shape. Further, as shown in FIG. 2, the wedge ring 166 may have a shape with at least one side being open to be radially expandable (i.e., to be opened). In an exemplary embodiment, the wedge ring 166 may have a shape with first and second sides being open, and as shown in FIG. 2, the wedge ring may be fabricated to be separated into two parts by a length of a half circle.

In other words, one wedge ring 166 may include two semicircular members 166a. The two semicircular members 166a may be arranged in a circle along the lower outer circumferential surface of the mount 100 (the outer circumferential surface of the pipe 131). Further, when assembled, as shown in FIGS. 1A to 1F, while the center bolt 110, the inner core 120, the insulator 130, the pipe 131, the orifice assembly 140, and the diaphragm 150 are assembled (see FIG. 1A), the wedge ring 166 may be first assembled to be disposed on the lower outer circumferential surface of the mount 100 (see FIG. 1B), and then the support bracket 160 may be coupled to the lower portion of the mount 100 from the lower side to the upper side (see FIG. 1C).

During this process, the second hook 165 of the support bracket 160 may be hook-coupled to the lower portion of the mount 100 and, more particularly, to the stop protrusion 132 that protrudes from the outer circumferential surface of the pipe 131 disposed at the lower portion of the mount 100, whereby the support bracket 160 may be fastened to the lower portion of the mount 100. In particular, the wedge ring 166 may be disposed at a location lower than the stop end 164a of the first hook 164 while being disposed at a location higher than the stop end 165a of the second hook 165 and the second stop protrusion 132.

Subsequently, the mounting bracket 170 may be assembled (see FIGS. 1D and 1E). After the mount 100 is inserted in the housing 171 of the mounting bracket 170, the support bracket 160 coupled to the mount 100 may be hook-coupled to the mounting bracket 170 with the first hook 164. In other words, the first hook 164 of the support bracket 160 may be allowed to be hook-coupled to the first stop protrusions 173 on the groove 172 formed on the inner surface of the housing 171 of the mounting bracket 170, and the stop end 164a of the first hook 164 may be allowed to be hook-coupled downwardly to the first stop protrusions 173 while being inserted in the groove 172. The wedge ring 166 may be disposed at a location lower than the stop end 164a of the first hook 164 and the first stop protrusions 173.

Furthermore, the wedge ring 166 may be pushed up using a jig 10 which will be described below, and as a result, the wedge ring 166 may be moved upward and may support the end portion of the first hook 164 at a location where the stop end 164a is disposed, which is the upper end portion of the first hook from the rear, i.e., from the inside (see FIGS. 1F and 3). As described above, when the wedge ring 166 is moved upward, as shown in FIG. 3, the moved wedge ring 166 may be disposed between the pipe 131, which is the lower portion of the mount 100, and the first hook 164 hook-coupled to the first stop protrusions 173. As a result, the wedge ring 166 may support the upper end portion of the first hook 164 from the inside, whereby after assembly, the first hook 164 may be prevented by the wedge ring 166 from bending inwardly, and thus the stop end 164a of the first hook 164 may be prevented from being separated from the first stop protrusions 173, and the fastening state of the first hook 164 may be prevented from being released.

Referring to FIG. 3, the support bracket 160 may be coupled to the mounting bracket 170 to allow the stop end 164a of the first hook 164 to be hook-coupled to the first stop protrusions 173 of the mounting bracket 170 and the wedge ring 166 may be disposed at the lower side and moved upward to support and lock the first hook 164 from the backward (from the inside) to prevent the first hook 164 from being released, i.e., the stop end 164a may be prevented from being separated from the first stop protrusions 173.

FIG. 4 shows another exemplary embodiment of the present invention, in which the mount assembly is provided with a sliding guide portion 134 and a locking protrusion 133. As shown in FIG. 4, the fixing structure may be disposed in the mount 100 to fix the wedge ring 166 to a position where the wedge ring 166 locks the first hook 164 to prevent the first hook 164 from being released. In other words, the wedge ring 166 may be moved upward to support the first hook 164. With the fixing structure, when the wedge ring 166 is pushed up to the position of locking the first hook 164, the wedge ring 166 may pass by the fixing structure, and after passing by the fixing structure, the wedge ring 166 that locks the first hook 164 may be hook-coupled downwardly to be prevented from moving downward. Thus, the downward movement of the wedge ring 166 may be constrained.

In an exemplary embodiment, the fixing structure may include the locking protrusion 133 that protrudes from the lower outer circumferential surface of the mount 100 that faces the upper end portion of the first hook 164, i.e., from the outer circumferential surface of the pipe 131 to prevent the wedge ring 166 that locks the first hook 164 from being moved downward due to being engaged therewith.

The wedge ring 166 may be moved upward and may pass by the locking protrusion 133, and then may be stopped by the locking protrusion at a position above the locking protrusion. Therefore, the wedge ring 166 with the downward movement thereof constrained by the locking protrusion 133 may support the upper end portion of the first hook 164, and accordingly, the separation of the first hook 164 due to the downward movement of the wedge ring 166 may also be prevented.

Further, in an exemplary embodiment, the lower surface of the mount 100 under the locking protrusion 133 may be formed with the sliding guide portion 134 having a cross section formed in an inclined structure to allow the wedge ring 166 to be pushed upward more easily. The sliding guide portion 134 may be formed with an inclined surface on the lower surface of the mount 100 under the locking protrusion 133 that protrudes outwardly, which is on the outer circumferential surface of the pipe 131 to allow the wedge ring 166 being moved upward to slide, and simultaneously the sliding wedge ring 166 to be radially expanded.

In particular, the inclined surface may be formed in the cross-sectional shape of the pipe 131 as shown in FIG. 4, to allow an outer diameter of the pipe 131 to gradually increase toward an upper portion thereof. Accordingly, when the wedge ring 166 is below the sliding guide portion 134 and is pushed up by the jig 10 described below, the wedge ring 166 that moves upward may slide along the surface (the cross sectional inclined surface) after contacting with the sliding guide portion 134. Thus, the wedge ring 166 that moves upward may move on the inclined surface of the sliding guide portion 134 and simultaneously a diameter thereof may increase, thereby sliding over the locking protrusion 133.

The sliding guide portion 134 with the cross-sectional inclined surface may be formed under the locking protrusion 133, whereby the wedge ring 166 may be pushed upward more easily, and when the wedge ring 166 is pushed from the lower side to the jig 10, the wedge ring 166 may be opened in the radial direction to more easily slide over the locking protrusion 133. As a result, when the wedge ring 166 moves along the sliding guide portion 134 and then crosses the locking protrusion 133, the wedge ring 166 may support the first hook 164 from the rear and the wedge ring 166 may be prevented from being separated downward by the locking protrusion 133, and therefore, a locked state may be achieved to maintain the hook-coupled state.

Figure 7:
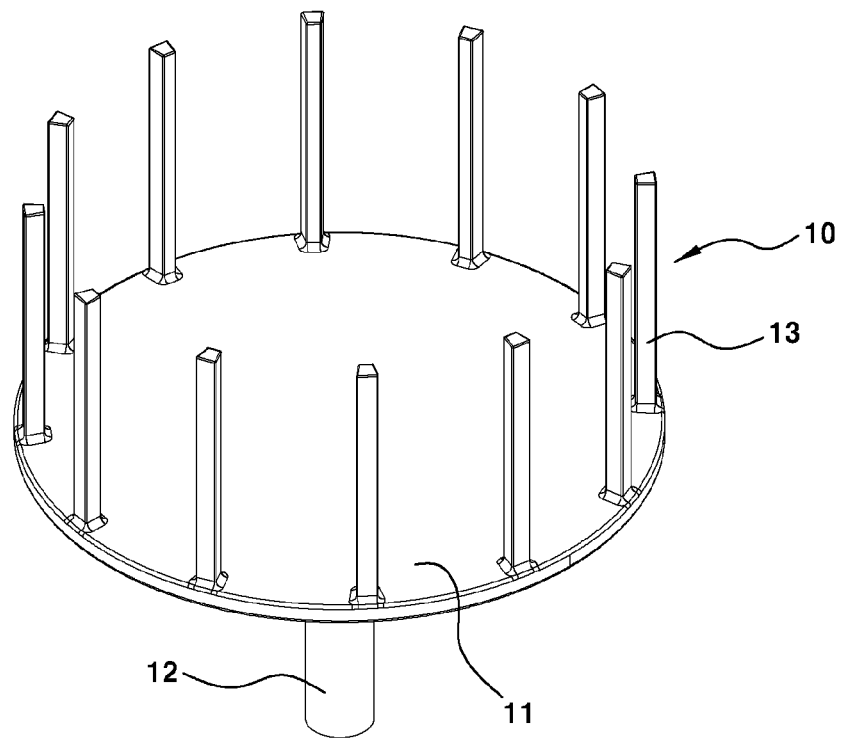
FIG. 7 is a perspective view showing a jig for assembling the wedge ring according to an exemplary embodiment of the present invention.
Figure 8:
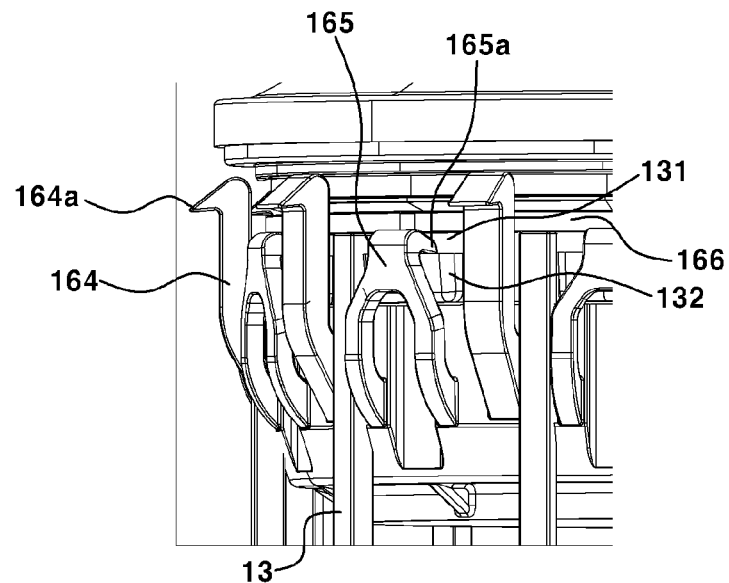
FIGS. 8 and 9 are enlarged perspective views respectively showing states before and after the wedge ring is moved up in the mount assembly according to an exemplary embodiment of the present invention.
Figure 9:
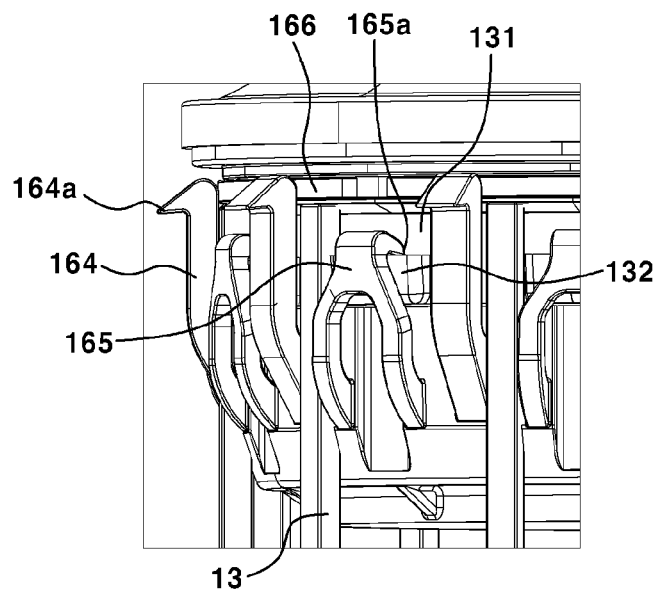
Figure 10:
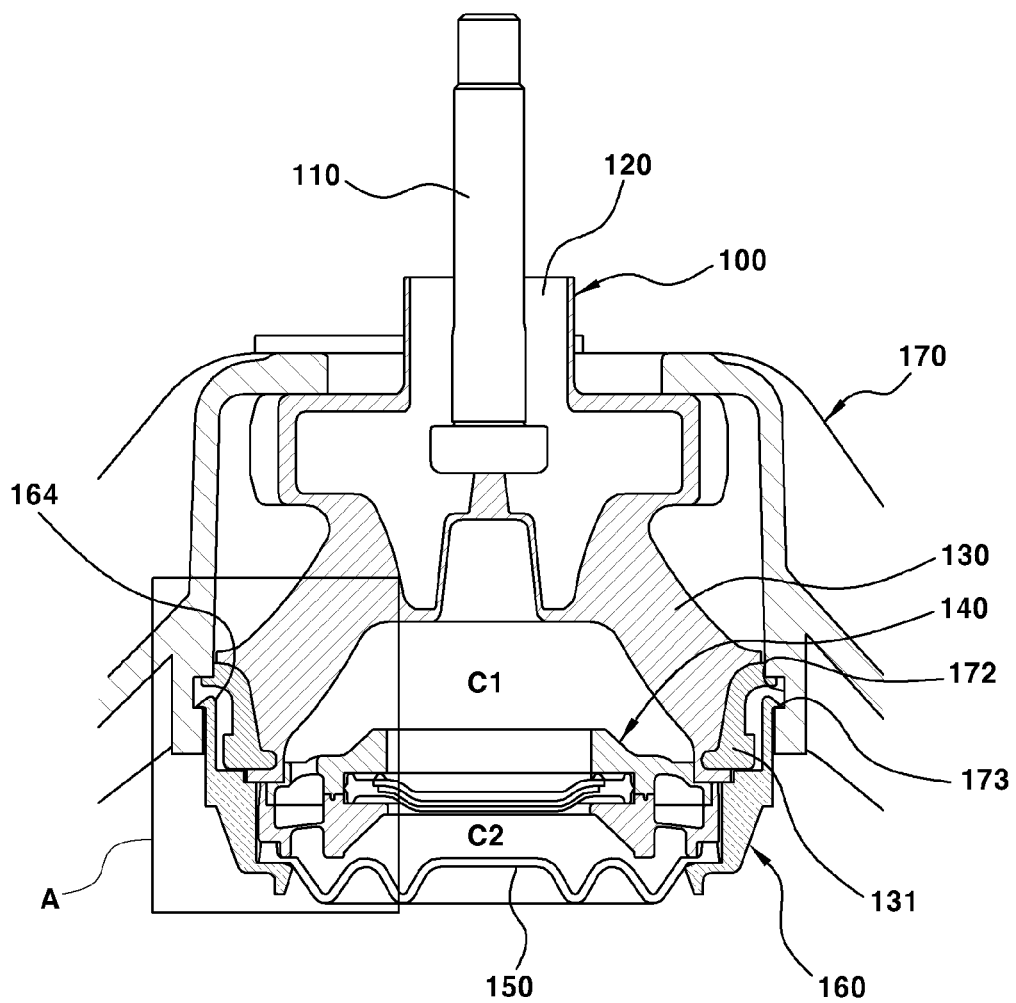
FIG. 10 is a cross-sectional view showing a mount assembly in the related art.
Figure 11:
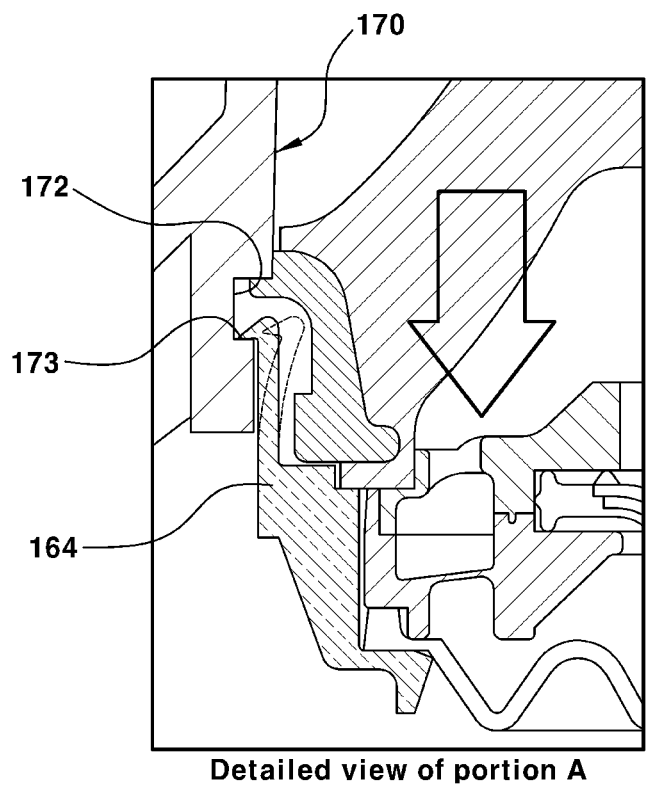
FIG. 11 is an enlarged cross-sectional view of portion A in FIG. 10 of the related art.

Furthermore, FIG. 7 is a perspective view showing a jig for mass production to push the wedge ring upward and FIGS. 8 and 9 are enlarged perspective views respectively showing states before and after the wedge ring is moved up in the mount assembly according to an exemplary embodiment of the present invention. The jig 10 may be a mass-production assembly tool for moving the wedge ring 166 to a fixed position with respect to the first hook 164 and may include pins 13 inserted through a space between the first hook 164 and the second hook 165 to allow the inserted pins 13 to push the wedge ring 166 upward.

The jig 10 may be made of a metallic material such as, for example steel, and may include a plate 11, a rod 12 coupled to the lower portion of the plate 11, and the pins 13 provided at an upper portion of the plate 11. The pins 13 may be disposed at predetermined intervals on the upper surface of the plate 11, and more specifically, may be arranged on the upper surface of the plate 11 to be circularly arranged at predetermined intervals along the circumferential direction. Further, the rod 12 may be coupled to a device (not shown) for moving the jig 10 vertically. For example, the rod 12 may be coupled to a piston of a cylinder mechanism (not shown).

To use the jig 10, as shown in FIGS. 5 and 6, a space may be provided between each of first hook 164 and the second hook 165 to allow the pins 13 of the jig 10 to be inserted and to move, and a pin channel 161a may be formed on the outer circumferential surface of the side portion 163 of the support bracket 160 to allow the pin 13 to be inserted to each space through the pin channel 161a. A plurality of pin channels 161a may be arranged at predetermined intervals on the outer circumferential surface of the side portion of the support bracket 160 along the circumferential direction.

As a result, while the rod 12 is engaged with the piston of the cylinder mechanism, when the cylinder mechanism operates to displace the piston upward as in FIG. 6, the pins 13 of the jig 10 may be inserted through the pin channels 161a and move between the first hook 164 and the second hook 165. Thus, the pins 13 that move upward may simultaneously push the wedge ring 166 upward at each position. Accordingly, the wedge ring 166 may be pushed upward by the pins 13 of the jig 10, and as described above, may pass by the locking protrusion 133 and move to a position that locks and supports the first hook 164 coupled to the first stop protrusions 173. Therefore, the assembly of the mount 100, the support bracket 160, and the mounting bracket 170 may be completed. FIG. 8 shows a state before the pins 13 of the jig 10 are moved upward, and in this state, the wedge ring 166 may be disposed at the lower side.

Further, FIG. 9 shows a state after the pins 13 of the jig 10 are moved upward, and in this state, the first hook 164 may be hook-coupled to the first stop protrusions 173, and as the jig 10 is moved upward, the pins 13 may push the wedge ring 166 upward. Accordingly, the wedge ring 166 may support the upper end portion of the first hook 164 from the rear, whereby the stop end 164a may be in the locked state where the stop end is prevented from being separated from the first stop protrusions 173.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mount assembly for a vehicle, comprising:
    a mount to support an in-vehicle device;
    a support bracket coupled to the mount and locked thereto, wherein the support bracket includes a first hook;
    a mounting bracket configured to couple the mount to a vehicle body side and support the mount, wherein the mounting bracket includes a housing having the mount coupled thereto and a first stop protrusion to which the first hook of the support bracket is hook-coupled to couple and lock the support bracket to the mounting bracket by coupling between the first hook and the first stop protrusion; and
    a wedge ring to support the first hook coupled to the first stop protrusion from behind while being assembled to a lower outer circumferential surface of the mount to prevent the first hook from bending backward and being separated from the first stop protrusion of the mounting bracket.

2. The mount assembly of claim 1, wherein the support bracket is coupled and locked to the mount to surround a lower portion of the mount, a plurality of first hooks are arranged at predetermined intervals along a circumferential direction in the support bracket, a plurality of first stop protrusions are disposed in the mounting bracket with the plurality of first hooks coupled thereto, and the wedge ring is disposed between the lower outer circumferential surface of the mount and the plurality of first hooks.

3. The mount assembly of claim 1, wherein the wedge ring is formed in a ring shape with at least one side open to be radially expandable.

4. The mount assembly of claim 1, wherein the wedge ring includes two elastic semicircular members, and the two semicircular members are arranged in a circle along the lower outer circumferential surface of the mount.

5. The mount assembly of claim 1, wherein when a stop end of the first hook is hook-coupled to the first stop protrusion, the wedge ring is disposed to support an end portion of the first hook with the stop end provided thereon from behind.

6. The mount assembly of claim 1, wherein the mount includes a fixing structure at a lower portion thereof to fix a position of the wedge ring to a position that supports the first hook coupled to the first stop protrusion from behind.

7. The mount assembly of claim 6, wherein the fixing structure includes a locking protrusion that protrudes from the lower outer circumferential surface of the mount to prevent the wedge ring that supports the first hook from being moved.

8. The mount assembly of claim 7, wherein the wedge ring is in a ring shape with at least one side open to be radially expandable, the lower portion of the mount under the locking protrusion includes a sliding guide portion in a shape with an outer diameter thereof gradually increasing toward an upper portion thereof, and the wedge ring slides upward while expanding radially through the sliding guide portion to be engaged with the locking protrusion.

9. The mount assembly of claim 7, wherein the wedge ring includes two elastic semicircular members and the two semicircular members are arranged in a circle along the lower outer circumferential surface of the mount.

10. The mount assembly of claim 9, wherein the lower portion of the mount under the locking protrusion includes a sliding guide portion in a shape with an outer diameter thereof gradually increasing toward an upper side, and the wedge ring slides to the upper side while expanding radially through the sliding guide portion to be engaged with the locking protrusion.

11. The mount assembly of claim 2, wherein the lower portion of the mount is a pipe coupled to a lower portion of an insulator.

12. The mount assembly of claim 2, wherein the support bracket includes a plurality of pin channels through which pins of a jig to push the wedge ring upward are inserted, and the plurality of pin channels are arranged on an outer circumferential surface of the support bracket along the circumferential direction.

13. The mount assembly of claim 1, wherein the housing of the mounting bracket is configured to accommodate the mount therein, the housing of the mounting bracket is disposed on an inner circumferential surface thereof with the first stop protrusion, and the first hook of the support bracket is hook-coupled downwardly to the first stop protrusion on the inner circumferential surface of the housing.

14. The mount assembly of claim 1, wherein the support bracket includes a second hook, and the mount is disposed on the lower outer circumferential surface thereof with a second stop protrusion to which the second hook is hook-coupled to couple and lock the support bracket to the mount by coupling between the second hook and the second stop protrusion.

15. The mount assembly of claim 14, wherein a plurality of second hooks are arranged at predetermined intervals along a circumferential direction in the support bracket, and a plurality of second stop protrusions are disposed on the lower outer circumferential surface of the mount with the plurality of second hooks coupled thereto.

16. The mount assembly of claim 14, wherein a lower portion of the mount is a pipe coupled to a lower portion of an insulator.

* * * * *